Feb. 17, 1970 M. ANESI 3,495,388
ADJUSTABLE ALL PURPOSE RAKE
Filed June 9, 1967
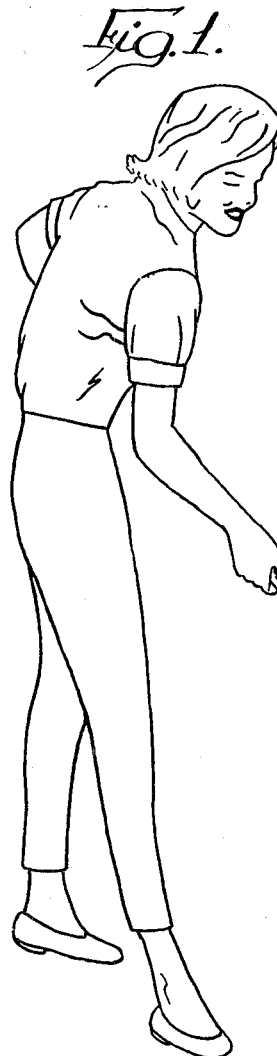
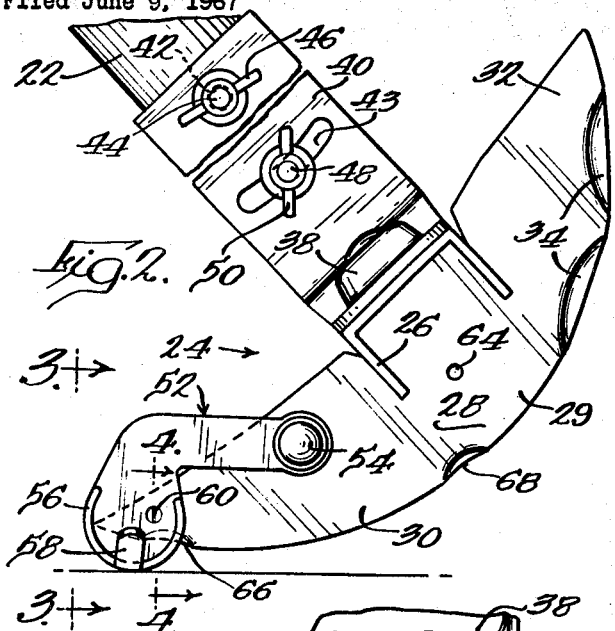
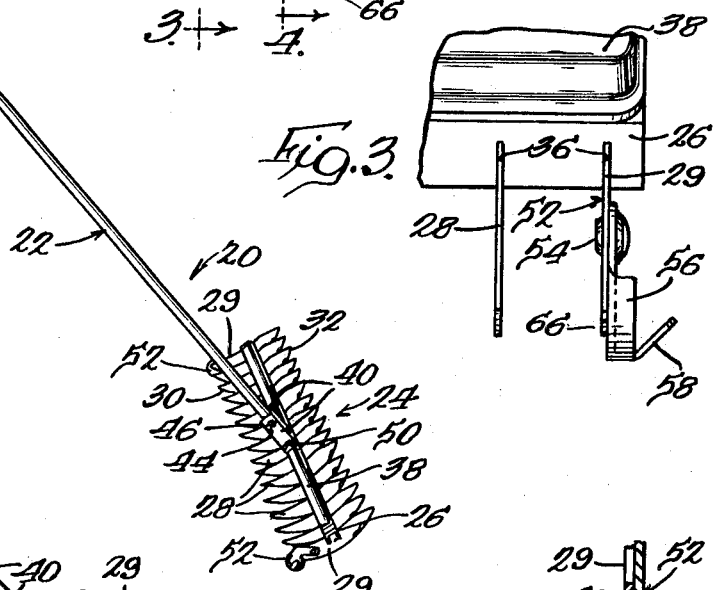
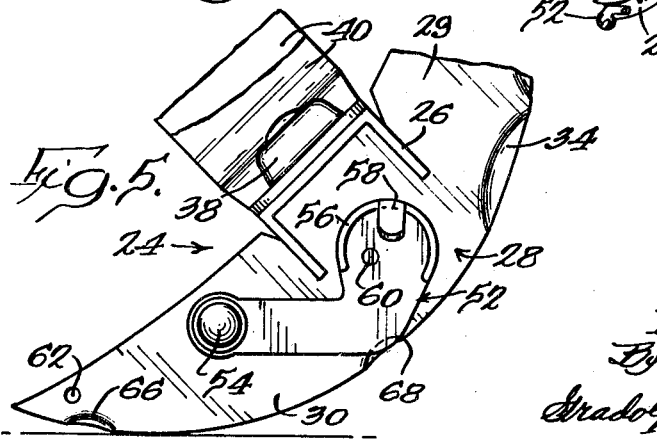
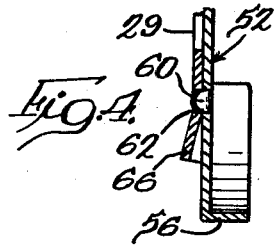
Inventor:
Mario Anesi

United States Patent Office 3,495,388
Patented Feb. 17, 1970

3,495,388
ADJUSTABLE ALL PURPOSE RAKE
Mario Anesi, 4750 N. Ronald Ave.,
Chicago, Ill. 60656
Filed June 9, 1967, Ser. No. 644,978
Int. Cl. A01d 7/00
U.S. Cl. 56—400.14                 2 Claims

ABSTRACT OF THE DISCLOSURE

An attachment for the rake having the usual handle, cross member and teeth protruding from the cross member which attachment includes spaced glide members which may be moved to an operative position or to an inoperative position and when in the operative position raise the rake from its normal raking level from raking leaves or cleaning the top of the grass without digging into the grass.

BACKGROUND OF THE INVENTION

Field of the invention

This invention relates to the art of garden or lawn rakes and the like.

Description of the prior art

Rakes formed of a handle and a raking portion formed of sheet metal or other materials attached to the handle are known. In addition, such rakes having one side for raking and another side for cultivating are known. However, rakes in the past have tended to dig into the ground or the lower level of the grass which has made it difficult to rake up leaves or clean the top of the grass. This problem is solved by the applicant's invention.

SUMMARY OF THE INVENTION

With the present invention, glides are provided preferably on each end of the rake which glides are pivotally attached to the teeth of the rake so that when the glides are in the operative position the rake will clean the top of the grass and collect leaves without digging into the grass. The rake is used like a carpet sweeper when the glides are in their operative position and when the rake is pulled the teeth become full and when it is pushed the material between the teeth is released. When the glides are in their inoperative position the teeth go below the top of the grass and rake up dead grass. Also the rake will lift up stringer or stolons and will clean bent grass lawns. In addition, the rake is provided with an adjustment between the handle and the transverse member to adjust the angle of the teeth and the glides which gives a choice of glide action for selected jobs.

BRIEF DESCRIPTION OF THE DRAWING

FIG. 1 is a perspective view of the rake embodying the invention being used;

FIG. 2 is a side elevational view of the rake with the glides in the operative position;

FIG. 3 is a partial sectional view of the rake taken on line 3—3 of FIG. 2;

FIG. 4 is a partial sectional view of the rake taken on line 4—4 of FIG. 2; and

FIG. 5 is a partial side elevational view of the rake with the glide in the inoperative position.

DESCRIPTION OF THE PREFERRED EMBODIMENT

Referring specifically to the drawing for a detailed description of the preferred embodiment of the invention, numeral 20 designates a complete all purpose rake which is the subject matter of my invention. The rake comprises a conventional handle 22 and a working head generally designated at 24.

The working head 24 comprises an inverted U-shaped transverse member, preferably formed from a metal channel and having a plurality of downwardly opening slots 36 formed within. A plurality of teeth or tines 28 extend into the slots 36 and are secured therein by any suitable means (not shown). The end tines of the rake are designated at 29. The teeth or tines include a raking portion 30 and a cultivating portion 32 which extend on opposite sides of the transverse member 26. The cultivating portion 32 is preferably provided with a pair of oppositely bent cultivating projections 34.

A pair of hollow reinforcing members 38 are riveted to the top of the transverse member 26 and are provided with a pair of upwardly extending ears 40. Holes 42 are provided adjacent the upper portion of the ears and arcuate slots 43 are provided adjacent the lower portion of the ears. A bolt 44 extend into the holes 42 and through a hole (not shown) in the handle 22. A wing nut 46 is secured to the bolt 44 to retain the top of the handle pivoted freely within the ears 40. A bolt 48 enters the arcuate slot 43 and passes through a second hole in the handle (not shown). A wing nut 50 cooperates with the bolt 48 for tightening the ears against the handle 22 to prevent relative rotation between the handle and the ears when the angle of the handle relative to the head 24 is in the desired position. The purpose of this arrangement is to provide for adjustability of the handle 22 relative to the working head 24 for a purpose hereinafter described.

A pair of generally L-shaped thin sheet metal glides 52 are preferably attached to the end tines 29 although they may be attached to any pair of spaced tines, assuming there is sufficient distance between the tines to serve the purpose. The glides 52 are pivotally secured to the end tines 29 by pivotal attaching members 54. The glides are provided with outwardly extending curved flanges 56 at the lower ends thereof. Members 58 project from the flanges 56 for engagement by the fingers of the user. Projections 60 extend toward the tines and apertures 62 and 64 are provided in the tines 29 to latch the projections in position either downwardly as shown in FIG. 2, which is the operative position, or upwardly as shown in FIG. 5, which is the inoperative position. Depressions 66 and 68 are provided in the tines 29 to slightly bend the glides 52 when they are moved from one position to the other so that the projections 60 will snap into the apertures 62 and 64 respectively; the glides 52 being sufficiently flexible to permit such bending.

When it is desired to clean the top of the grass or rake up leaves, the glides are moved to the downward or operative position shown in FIG. 2. In this position there is no digging into the grass. The rake is used as a carpet sweeper; when it is pulled toward the user it is filled and when it is pushed away from the user it is cleaned.

When it is desired to go below the top of the grass, the glides are placed in the upward or inoperative position shown in FIG. 5. In this position the rake goes below the top of the grass and is ideal for raking up dead grass, lifting up stolons or stringer or cleaning up bent lawns. In so using the rake, a short grip should be used to keep the tines from the ground.

The angle of the rake with respect to the handle may be adjusted to give a comfortable handling angle in any position and this cooperates with the glides 52 to provide the ideal position of the rake when it is being used for cleaning the top of the grass or raking leaves with the glides in the operative position.

The cultivating tines 32 are ideal for cultivating, working top dressing and pulverizing the soil around trees, bushes and seed beds.

From the foregoing it is apparent that I have provided an improved all purpose rake with adjustable glides and handle which is self-cleaning and with which there is no need to lift the rake from the ground. It eliminates back aches caused by old style rakes and provides for both cleaning grass and raking leaves and also for going below the top of the grass for the purposes described.

I claim:
1. An attachment in combination with a rake for lawns and the like which rake includes a plurality of teeth projecting from a retaining member and a handle member attached to the retaining member,
   (a) said attachment comprising at least two spaced smooth semi-circular glide members attached to a pair of said teeth for lifting the rake from its normal raking level when in their operative position, and
   (b) pivot means affording movement of the glide members to an inoperative position.

2. The attachment claimed in claim 1 including locking means for retaining the glide members in the operative or the inoperative position.

References Cited

UNITED STATES PATENTS

| | | | |
|---|---|---|---|
| 962,576 | 6/1910 | Menzl | 56—400.2 |
| 2,178,288 | 10/1939 | Potts | 56—400.09 |
| 3,193,999 | 7/1965 | Hester | 56—400.16 |

ANTONIO F. GUIDA, Primary Examiner

GREGORY E. McNEILL, Assistant Examiner